J. WHARTON.
Making White Zinc.
No. 37,190.
Patented Dec. 16, 1862.
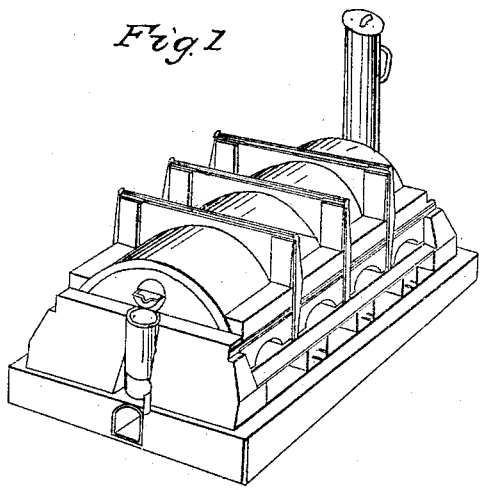
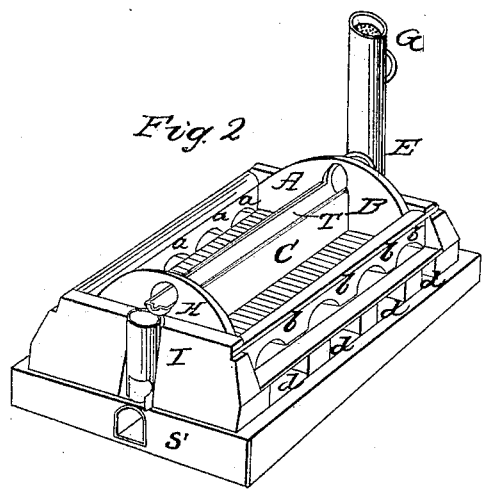
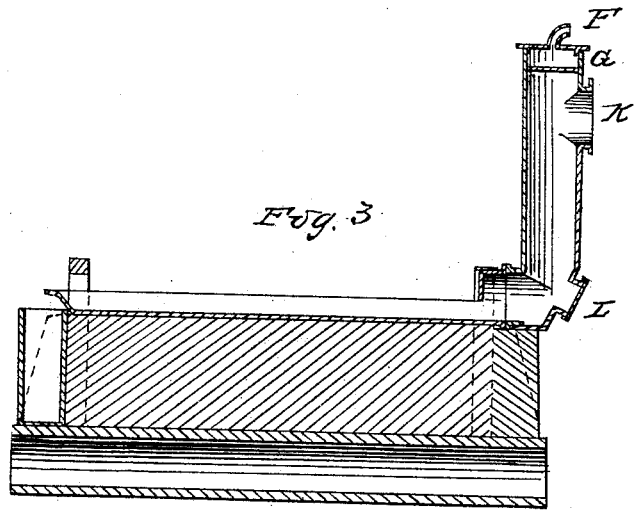
Witnesses
Inventor
Joseph Wharton

UNITED STATES PATENT OFFICE.

JOSEPH WHARTON, OF PHILADELPHIA, PENNSYLVANIA.

IMPROVEMENT IN FURNACES FOR THE MANUFACTURE OF OXIDE OF ZINC.

Specification forming part of Letters Patent No. 37,190, dated December 16, 1862.

*To all whom it may concern:*

Be it known that I, JOSEPH WHARTON, of the city of Philadelphia and State of Pennsylvania, have invented a new and useful Improvement in the Construction of Furnaces for the Manufacture of White Oxide of Zinc; and I do hereby declare the following to be a full and exact description thereof, reference being had to the annexed drawings, making a part of this specification, in which—

Figure 1 is a perspective view of the exterior of my furnace. Fig. 2 is a perspective view of the furnace with the top removed. Fig. 3 is a vertical longitudinal section through the center of the furnace.

My improvement has for its object the removal of impurities from the oxide of zinc in the furnace, where the same is produced from the ore and before it is collected, the operation being effected in a more simple and efficacious manner than in the improved furnace for which Letters Patent were granted to me July 29, 1856.

A B, Fig. 2, represent the furnace used in the manufacture of white oxide of zinc from the ore. I construct a division-wall, C, extending the whole length of the furnace, and dividing it into the two distinct portions A and B. Each of these furnaces A and B has its separate set of feeding-doors, $a\,a\,a$ and $b\,b\,b$. Under the two furnaces a series of separate apartments is formed by piers, of which the ends are seen at $d\,d\,d\,d$, which continue back to the bottom of the division-wall C. Each of the divisions of the ash-pit is furnished with its own distinct blast, which has its own distinct regulator to adjust the amount of blast. The blast is admitted at S, and passes under the bottom of the division-wall C into the interior of each alternate division-wall $d$. These alternate division-walls are hollow cast-iron boxes, and have apertures with sliding dampers to admit the passage of air into either ash-pit. The division-wall C is surmounted by a trough of cast-iron sunk into its top and kept full of water by a flow from the upright trunk E. This trunk is supplied with water in the form of a shower, which water enters through a supply-pipe at F, and then passes through a perforated plate or colander at G, and falls in a shower through the trunk E, and then passes along the trough T, and discharges or overflows at H into an open-mouthed receiver, I, made of boiler-iron. The receiver is filled with ashes and fire-cinders of the furnace, which form a filter. The water finally escapes or is thrown out at the bottom of the receiver I by a tube or other aperture.

The operation of the furnace thus constructed is as follows: The two sides of the furnace A and B being charged with the zinc ore and coal in the usual manner, the combustion is maintained by a blast of air through the ash-pits in the usual manner. The products of combustion—viz., various gases, bearing with them the light flocculent solid zinc oxide, together with ashes and other light solid impurities—rise from the bed of the furnace on both sides, meet together under the crown of the arch, and are reverberated onto the surface of the water in the trough T. The surface of the water catches a large part of the dust and other solid impurities, together with a trifling quantity of the zinc oxide, and some sulphurous-acid vapor, all of which are borne with the water to the overflow at H, and then into the receiver I, where they are caught by the filtering material, while the water trickles through and escapes. This filtering material in time becomes so charged with zinc oxide as to have sufficient value to be worked as an ore in the furnace. The bottom of the trough on the wall C may be cleaned, whenever it is desired, by the insertion of a scraper at H or L. The vapors and zinc oxide, as they impinge on the surface of the water, are carried along the trough on top of C toward and through the upright trunk E, and through the aperture K, by means of a suction-ventilator, and discharged by it into proper collecting rooms and bags in the usual manner. The vapors and zinc oxide, while passing through the vertical trunk E, encounter the shower of water through the colander G, which removes any impurities which were not removed by contact with the surface of water while passing along the trough on top of the wall C.

Having thus described my improvement, what I claim as my invention, and desire to secure by Letters Patent, is—

1. The trough T and trunk E, for introducing water into the furnace for the purpose of cleansing the zinc oxide while in the furnace and at the instant of its production, substantially as above described.

2. The arrangement of the furnaces A and B, the division-wall C, and the reverberatory arch or cover, substantially as shown.

JOSEPH WHARTON.

Witnesses:
J. G. MINI CHILD,
CHARLES B. HELFENSTEIN.